June 16, 1964  E. E. ZANG  3,137,080
VITAVUE RELIEF MODEL TECHNIQUE
Filed March 16, 1962
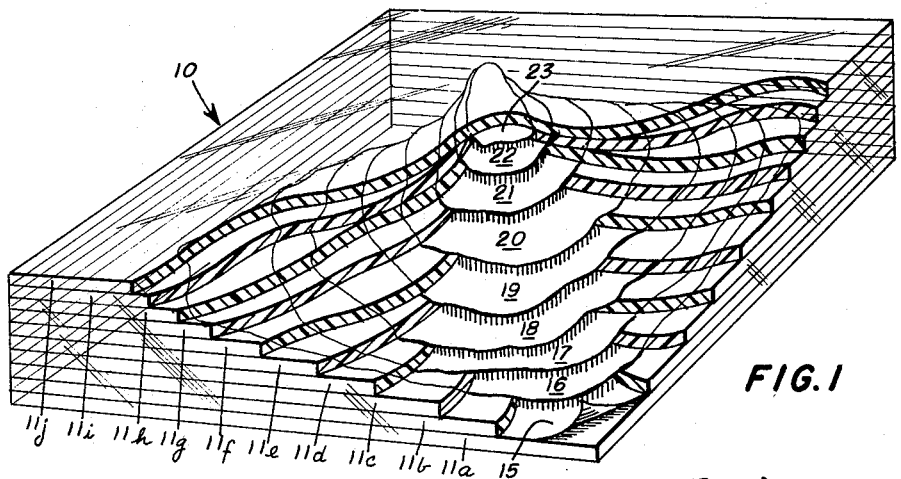
FIG. 1
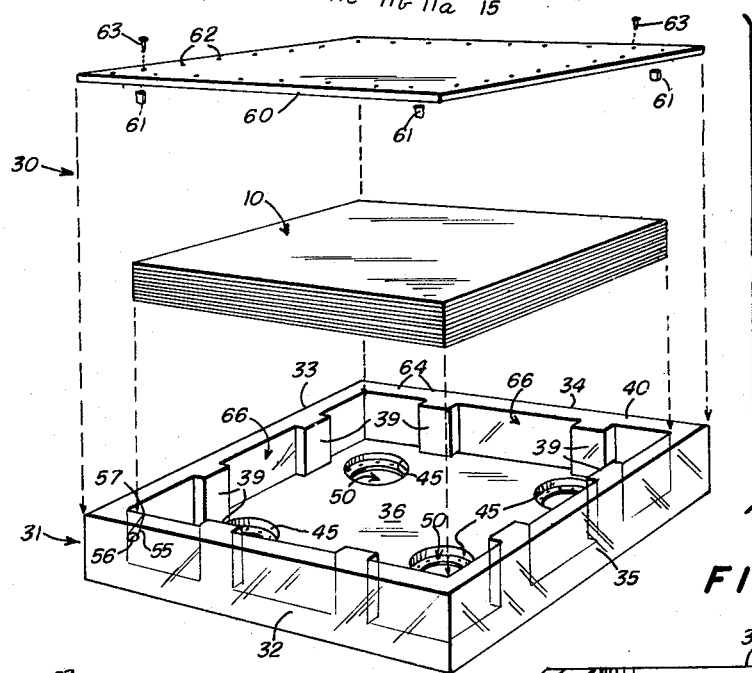
FIG. 2
FIG. 3
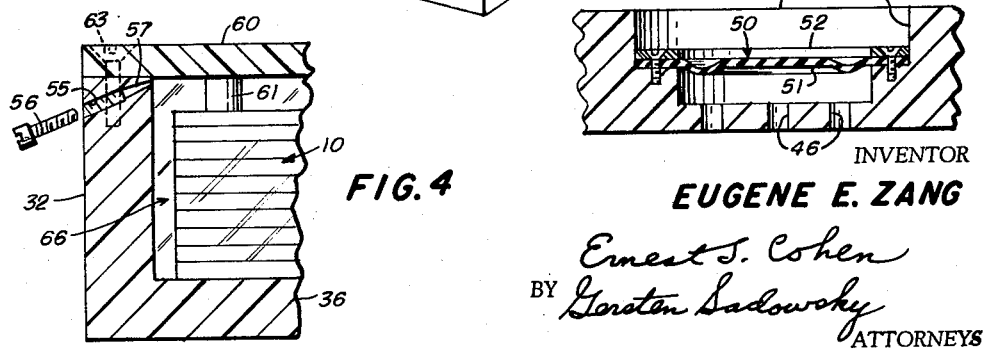
FIG. 4
INVENTOR
EUGENE E. ZANG
BY Ernest J. Cohen
Gersten Sadowsky
ATTORNEYS

United States Patent Office 3,137,080
Patented June 16, 1964

3,137,080
VITAVUE RELIEF MODEL TECHNIQUE
Eugene E. Zang, Washington, D.C., assignor to the United States of America as represented by the Secretary of the Interior
Filed Mar. 16, 1962, Ser. No. 180,371
1 Claim. (Cl. 35—41)
(Granted under Title 35, U.S. Code (1952), sec. 266)

The invention herein described and claimed may be manufactured and used by or for the Government of the United States of America for governmental purposes without the payment of royalties thereon or therefor.

This invention relates to three-dimensional models of land areas and the like, shown on topographical maps and other similar relief exhibits. A visual display such as is afforded by the improved structure of the invention, makes available a unique aid for facilitating studies made by geologists, civil engineers, topographers, and military personnel.

It is a primary objective of the present invention to provide a realistic three-dimensional model of a contoured surface such as a land mass, whereon significant details of the characteristic features on the surface modeled, may be accurately observed.

Another object of the present invention is to provide a three-dimensional exhibit from which a realistic illusion of solidity is obtained by means of superimposing layers of transparent material alternately with sheets of printed matter illustrating successive portions of a model to be exhibited.

A still further object of the present invention is to provide an improved construction for a three-dimensional exhibit permitting it to be simply and economically produced.

These and other objects and advantages of the invention will be more clearly understood from the following description of a preferred embodiment of the invention, considered together with the accompanying drawings wherein:

FIG. 1 is a perspective view of an assembled topographical model wherein portions are shown in section to reveal an internal arrangement of parts within the model;

FIG. 2 is an exploded view of an exhibit according to the invention, illustrating in detail the various elemental parts which make up the enclosure containing the assembled model of FIG. 1;

FIG. 3 is a fragmentary view of the bottom element of the enclosure shown in FIG. 2, including a sectional view of a pressure relief device therein; and FIG. 4 is also a fragmentary view of the enclosure, including a sectional view of several of the elemental parts thereof.

Previous attempts to produce a three-dimensional exhibit of a topographic view in the nature of that constituting the present invention, achieved no more than an inflated map effect wherein successive individual contour lines were made to appear floating one above the other. In one such three-dimensional exhibit disclosed by Patent No. 2,556,798, to Concordet, issued June 12, 1951, each two successive contour lines of a topographic map are printed on opposite surfaces of separate ones of a series of transparent plates, which are disposed in parallel planes one on top of the other in spaced relationship. As explained at several points in this patent, there is produced by the construction it discloses only a three-dimensional map. On the other hand, by means of the present invention a singular illusion is created in which the appearance of a floating map is importantly enhanced by presenting a view thereof as resting upon a three-dimensional solid mass in accurate conformation therewith.

Referring to FIG. 1, the bulk of the model is seen as an assembly 10, comprising an aligned stack of essentially identical flat, transparent, and rectangular plates 11a to 11j. A suitable material for these plates would be glass, or a clear plastic such as one having the properties of Plexiglas, or Lucite (polymerized methyl methacrylate). Length and width dimensions for the plates are generally selected to conform with the relative size of the model to be exhibited, and the thickness of an individual plate is usually determined by the degree of vertical exaggeration desired. As will be hereinafter more fully explained, the individual plates 11a to 11j, are used only as spacers, and are not inscribed, carved, or molded in any manner.

All the distinguishing surfaces, lines, and other related indicia to be seen on the completed model 10, are created by markings and coloring formed or imprinted as spaced layers 15 to 23 of suitable semi-transparent or opaque material such as paper, cloth, plastic, etc., which may be cut from standard printed shaded-relief topographic maps. To proceed in a preferred manner, there is obtained a sufficient number of identical copies of a topographical map of the area selected to be exhibited. As indicated, map materials reproduced in color and having requisite elevational shading thereon, are preferred, although other map forms may be used. Reserving one copy of the selected map intact for the foundation or basic map layer of the model, the remaining copies are each carefully cut following around a different one of the contour lines shown. For example, with reference to the extreme contour line, or one designating the lowest elevation, as a cutting guide, one map is cut-out as indicated to extract from the map only the area that falls at and above this elevation. Another copy of the map is similarly cut on a contour line designating the next elevational level to produce a layer including all the following contours. Proceeding in this manner for each of the subsequent contour lines, one layer or more if practicable, is cut out from a copy of the map, whereby each such map layer shows that area corresponding to the elevation designated by the contour defining the particular layer, as well as all contour lines following thereafter. Cutting the maps by hand may be conveniently accomplished by the use of an ordinary sharp hobby knife.

Turning once more to FIG. 1, there is illustrated a bottom or base plate 11a, to which is cemented a bottom map layer 15 constituting the complete or unaltered copy of the selected topographical map. Immediately above the base plate 11a and layer 15 thereon, may be seen another plate 11b on which is cemented a map layer 16, cut out from a copy of the map to conform to the contour of the next elevation designated. When plates 11a and 11b are squarely aligned with each other, cut-out map layer 16 is found to be oriented so as to lie directly over the contour line on map layer 15, corresponding thereto. The further arrangement of FIG. 1, duplicates the construction already described whereby each succeeding one of the plates 11c to 11i, is aligned to register with the stacked plates below it, and has cemented upon its upper face the one of the map layer cut-outs 17 to 23, which corresponds to the regularly spaced contour line next to the one defining the map layer just preceding it, and located on its plate to lie over the complete area within the aforesaid next contour line as seen on the map layer of the plate below. A rubber base cement, such as one having the properties of Pliobond, may be used to attach the map layers to the plates. Other adhesives which would not discolor itself or the map materials, and would be resistant to the solvent effects of oils, would also be suitable for joining the map layers to the plates. Before each of the map layers was formed and attached in its proper place on the plate, it was sprayed with a uniform cover of clear plastic coating material, such as one having the properties of the acrylic Krylon Crystal Clear Spray Coating.

To cooperate with the model 10, to house it, and maintain its parts in place, the invention combines therewith an enclosure 30, the separated parts of which are revealed in the exploded view of FIG. 2. Shown at the bottom of this figure is an open container portion 31, comprising side or wall elements 32, 33, 34, and 35, and a bottom or base element 36. Elements 32 to 36 which are preferably made from a clear plastic material having sufficient thickness for structural soundness, are welded together to form the box-like configuration of portion 31. On the interior side of each of the wall elements 32 to 35, are welded one or more blocks 39, also made of clear plastic. Blocks 39 which span the inside height of the walls to which they are attached, are of substantial width, and of sufficient thickness to act as spacers to properly locate and maintain the model 10 in an appropriate position within the container portion 31. Base element 36 of the container portion, is provided with a number of relatively large diameter shallow, circular two-step depressions 45. With reference to the sectional view of FIG. 3, the bottom surface of the lower step of each of the depressions 45, may be seen to have a plurality of small holes 46 arranged therein, to provide passages to the outside of the container portion. Snugly seated on the ridge formed by the upper step of each of these depressions, is a yieldable device comprising a diaphragm 50 including a flexible disk 51, and a retaining ring and screws 52. As will be hereinafter explained more fully, the plurality of diaphragms 50, act as a pressure compensating means in the exhibit which is sealed when completed. Adjacent an upper rim 40 of the container portion 31, and passing through wall 32 thereof, may be seen a small upwardly inclined conduit 55. As indicated with further clarity in the sectional view of FIG. 4, screw threads starting from the outside wall opening of conduit 55, receive a machine screw 56 which acts to plug the opening, and a converging nozzle-like passage 57 joins the conduit 55 to the opening on the inside of wall 32. Enclosure cover 60 shown in the upper part of FIG. 2, is also made of the clear plastic material used substantially throughout the exhibit. Welded to the underside of cover 60 may be seen a plurality of shim elements 61 which like the spacers 39, act to locate and maintain the model 10 within the enclosure. A plurality of holes 62 drilled through the cover 60 at spaced intervals adjacent its peripheral edges, are provided to hold machine screws 63 which are adapted to be received in matching threaded holes 64 in the upper rim 40 of the container portion 31.

Assembling the exhibit requires that the container portion 31 with diaphragms 50 properly fastened in its circular depressions 45, be filled to about one-third its volume with a water-clear light oil. An oil having the properties of Dow Corning 200 Fluid (silicone oil), with a viscosity of 50 centistokes, was found to be satisfactory for this purpose. Other liquids which are water white, of sufficiently low viscosity to flow readily to all spaces between the stacked plates, and which would be nonevaporating and noncorrosive or relatively inert so as not to effect the other components, may be employed. Model 10 is put together within the enclosure one plate at a time, starting with plate 11a and its map layer 15 cemented thereon facing up, being lowered into the oil to come to rest on bottom element 36. Spacers 39 on the enclosure walls, effectively guide the plate 11a to its resting place, and maintain its position thereat. The remaining plates with map layers attached, are then individually and in the sequence previously indicated, lowered through the oil to form within the enclosure portion 31, the aligned stack of plates comprising the model 10. A further plate 11j devoid of any map material, is finally placed on the aligned stack to complete the arrangement within the enclosure. In addition to maintaining the plates 11a to 11j and the map layers attached thereto, in proper alignment, the spacers 39 also define passages 66 alongside the stacked plates, wherein the oil may flow freely to fill the spaces under, around, and between the individual plates. Care should be taken to avoid entrapping air bubbles between the plates. Coloring on the various layers of map material is protected from the deleterious effects of the oil by the aforementioned clear plastic coating sprayed thereon.

Following the completion of the assembly of model 10 within the container portion 31, the cover 60 may be attached to the rim 40 of the container to form the over-all enclosure for the exhibit. To provide an oil seal around the contacting closure surfaces of the cover and the container, gasket cement is applied thereon before the cover is fastened down by means of the screws 63 in holes 62 thereof, being received in the threaded holes 64 of the container. Cover 60 thereby brings the shims 61 attached thereto, into contact with the top plate 11j of the model, to firmly fix the latter in position between the spacers 39, and on the bottom element 36 of the container. Space remaining between the upper surface of top plate 11j and the underside of cover 60, is filled with oil from a syringe fitted into conduit 55 and passage 57, and made operable to force oil into the space and withdraw air displaced therefrom. Screw 56 is applied within the conduit 55 to plug its opening after the syringe is withdrawn. Reflections on the highly polished plastic surfaces are eliminated by the use of the clear silicone oil. By reason of the layer or thin film of the oil supplied to coat the surfaces of the plates and fill spaces between them, the individual surfaces of these plates become invisible thus eliminating the reflections.

With the elements of FIG. 2 completely assembled and sealed to enclose the model in oil, flexible diaphragms 50 in the bottom element thereof, function together with passages 46 in the depressions 45, to become operative as needed to relieve oil pressure which may build up due to handling, temperature changes, and changes in atmospheric pressure as for example would be occasioned by changes in altitude. Experience has shown that at least one diaphragm is required for every 150 cubic inches of the model.

By means of the construction described an illusion of striking realism may be created. Spacing the map layers one on top of the other between the plates of clear plastic material produces a vertical dimension of unusual character wherein these individual map layers seem to blend into solid forms. Any printed map may be transformed thereby from a flat plane to this third dimensional model. Moreover, unlike similar three-dimensional models previously available, the present invention is as accurate as the topographic map on which it is based, since the map is employed in the construction of the model. All the details shown in the topographic map can be featured in the model, including the smallest peaks or hill tops no bigger than a pinhead.

While one embodiment of the invention and a practical application thereof have been described, it will be obvious that changes in detail may be made without departing from the spirit of the invention.

What is claimed is:

A three-dimensional model comprising a plurality of transparent plates squarely aligned one plate above another, to form a stack, a like plurality of layers of semi-transparent or opaque material, each of the respective ones of said layers being fixedly attached to an individual plate, and each said layer except the one attached to an uppermost plate of the stack, having imprinted thereon indicia having a predetermined regularly graduated relationship with indicia on the layers attached to plates above, the layer attached to the uppermost plate having imprinted thereon indicia indicative of a terminal point in said graduated relationship, each of said layers being spacially arranged on their respective plates to overlie one another in accordance with a characteristic configuration of the aforesaid indicia predetermined in accordance with said graduated relationship, means enclosing and sealing the stacked plates and layers therein, said enclosing means comprising a base having integral therewith transparent walls, and a cover of transparent material fixed to upper rims of said walls to seal the enclosing means, a pluggable conduit means in one of said walls adjacent an upper rim thereof, adapted to receive means supplying transparent liquid material to within the enclosing means, said liquid material filling spaces between the plates of the stack, and between the stack, the base, walls and cover of the enclosing means, and said base having therein a pressure relief means including a flexible, expandable element operatively responsive to variations in the pressure within the sealed enclosing means.

References Cited in the file of this patent

UNITED STATES PATENTS

| | | |
|---|---|---|
| 2,105,008 | Riley | Jan. 11, 1938 |
| 2,138,024 | Cheesman | Nov. 29, 1938 |
| 2,556,798 | Concordet | June 12, 1951 |
| 2,988,827 | Johnson et al. | June 20, 1961 |

FOREIGN PATENTS

| | | |
|---|---|---|
| 825,281 | Great Britain | Dec. 16, 1959 |